US012603227B2

(12) United States Patent
Park et al.

(10) Patent No.: US 12,603,227 B2
(45) Date of Patent: Apr. 14, 2026

(54) MULTILAYERED CAPACITOR AND MANUFACTURING METHOD OF THE SAME

(71) Applicant: SAMSUNG ELECTRO-MECHANICS CO., LTD., Suwon-si (KR)

(72) Inventors: Sehun Park, Suwon-si (KR); Youngghyu Ahn, Suwon-si (KR); Sung-Min Cho, Suwon-si (KR); Taejoon Park, Suwon-si (KR); Hwidae Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 190 days.

(21) Appl. No.: 18/235,531

(22) Filed: Aug. 18, 2023

(65) Prior Publication Data

US 2024/0312716 A1 Sep. 19, 2024

(30) Foreign Application Priority Data

Mar. 13, 2023 (KR) ........................ 10-2023-0032771

(51) Int. Cl.
*H01G 4/30* (2006.01)
*H01G 4/008* (2006.01)
(Continued)

(52) U.S. Cl.
CPC .............. *H01G 4/30* (2013.01); *H01G 4/008* (2013.01); *H01G 4/012* (2013.01); *H01G 4/12* (2013.01)

(58) Field of Classification Search
CPC .......... H01G 4/30; H01G 4/005; H01G 4/008; H01G 4/12; H01G 4/012; H01G 2/06
(Continued)

(56) References Cited

U.S. PATENT DOCUMENTS 5,486,277 A 1/1996 Barbee, Jr. et al.
2004/0190221 A1 9/2004 Yamaguchi et al.
(Continued)

FOREIGN PATENT DOCUMENTS

JP 2004-228468 A 8/2004
JP 2004-296709 A 10/2004
(Continued)

OTHER PUBLICATIONS

The Extended European Search Report dated Oct. 29, 2024 issued in European Patent Application No. 23205502.0.
(Continued)

*Primary Examiner* — Arun Ramaswamy
(74) *Attorney, Agent, or Firm* — Morgan, Lewis & Bockius LLP

(57) ABSTRACT

A multilayer capacitor includes: a body including a dielectric layer, and first and second internal electrodes stacked on each other in a thickness direction of the capacitor while being spaced apart from each other with the dielectric layer interposed therebetween; a first external electrode connected to the first internal electrode; and a second external electrode spaced apart from the first external electrode in a length direction of the capacitor that is perpendicular to the thickness direction, and connected to the second internal electrode. One of the first internal electrode and the second internal electrode has a horizontal plane perpendicular to thickness direction and an inclined plane inclined with respect to the horizontal plane in at least a partial region thereof.

19 Claims, 26 Drawing Sheets

(51) Int. Cl.
    *H01G 4/012*     (2006.01)
    *H01G 4/12*     (2006.01)

(58) Field of Classification Search
    USPC ............. 361/301.4, 303, 306.3, 321.1, 321.3
    See application file for complete search history.

(56)                References Cited

U.S. PATENT DOCUMENTS

| | | | |
|---|---|---|---|
| 2006/0214263 A1 | 9/2006 | Kojima et al. | |
| 2013/0120901 A1 | 5/2013 | Masuda | |
| 2013/0229748 A1* | 9/2013 | Chung | H01G 4/30 |
| | | | 336/200 |
| 2017/0125167 A1* | 5/2017 | Kawakami | H01G 4/236 |
| 2017/0194419 A1 | 7/2017 | Lee et al. | |
| 2017/0243695 A1* | 8/2017 | Kim | H01G 4/012 |
| 2019/0148068 A1* | 5/2019 | Lee | H01G 4/385 |
| 2021/0241976 A1* | 8/2021 | Nakano | H01G 11/26 |

FOREIGN PATENT DOCUMENTS

| | | | |
|---|---|---|---|
| JP | 2013-102103 A | 5/2013 | |
| KR | 10-1783112 B1 | 10/2017 | |
| KR | 10-1792381 B1 | 11/2017 | |

OTHER PUBLICATIONS

1 Partial European Search Report dated May 2, 2024 issued in European Patent Application No. 23205502.0.

* cited by examiner

MULTILAYERED CAPACITOR AND MANUFACTURING METHOD OF THE SAME

CROSS-REFERENCE TO RELATED APPLICATION

This application claims priority to and the benefit of Korean Patent Application No. 10-2023-0032771 filed in the Korean Intellectual Property Office on Mar. 13, 2023, the entire contents of which are incorporated herein by reference.

TECHNICAL FIELD

The present disclosure relates to a multilayer capacitor and a manufacturing method of the same.

BACKGROUND

An electronic component used in an electronic device may include a capacitor, an inductor, a piezoelectric element, a varistor, or a thermistor. The multilayer capacitor among these ceramic electronic components may be used in various electronic devices because the capacitor is small, implements high capacitance, and is easily mounted.

For example, the multilayer capacitor may be used as a chip-type capacitor serving to charge or discharge electricity by being mounted on a substrate of various electronic products such as a video device such as a liquid crystal display (LCD), a plasma display panel (PDP), or an organic light-emitting diode (OLED) display, a computer, a personal portable terminal, and a smart phone.

In accordance with a recent trend that the electronic product becomes smaller and thinner, there is an increasing demand for a multilayer capacitor which is thinner than an existing multilayer capacitor.

SUMMARY

Embodiments of the present disclosure provide a multilayer capacitor in which several layers of first internal electrodes and second internal electrodes are stacked on each other, while maintaining its smaller thickness, and a manufacturing method of the same.

Embodiments of the present disclosure also provide a multilayer capacitor in which a first internal electrode and a second internal electrode are respectively connected to a first external electrode and a second external electrode, and effectively short-circuited from the second external electrode and the first internal electrode respectively, and a manufacturing method of the same.

According to an embodiment, a multilayer capacitor includes: a body including a dielectric layer, and first and second internal electrodes stacked on each other in a thickness direction of the capacitor while being spaced apart from each other with the dielectric layer interposed therebetween; a first external electrode connected to the first internal electrode; and a second external electrode spaced apart from the first external electrode in a length direction of the capacitor that is perpendicular to the thickness direction, and connected to the second internal electrode. One of the first internal electrode and the second internal electrode has a horizontal plane perpendicular to the thickness direction and an inclined plane inclined with respect to the horizontal plane in at least a partial region thereof.

An upper surface of the first internal electrode may be inclined downward in the length direction from the first external electrode toward the second external electrode.

A lower surface of the second internal electrode may be inclined upward in the length direction from the second external electrode toward the first external electrode.

The first internal electrode and the second internal electrode may be point-symmetrical to each other based on their cross sections in the thickness direction and the length direction.

An upper surface of the first internal electrode may include a first inclined part disposed in a region where the first internal electrode opposes the second internal electrode in the thickness direction, and a first horizontal part disposed outside the region where the first internal electrode opposes the second internal electrode in the thickness direction.

A lower surface of the second internal electrode may include a second inclined part disposed in a region where the second internal electrode opposes the first internal electrode in the thickness direction, and a second horizontal part disposed outside the region where the second internal electrode opposes the first internal electrode in the thickness direction.

The dielectric layer may include a first dielectric layer disposed between an upper surface of the first internal electrode and a lower surface of the second internal electrode opposing each other in the thickness direction, and inclined in the length direction, and a second dielectric layer disposed between a lower surface of the first internal electrode and an upper surface of the second internal electrode opposing each other in the thickness direction, and parallel to the length direction.

The first dielectric layer or the second dielectric layer may have a uniform thickness between the first internal electrode and the second internal electrode in the length direction.

The body may include a first body and a second body adjacent to each other and respectively connected to the second external electrode, and each of the pair of first external electrodes may oppose the second external electrode while having the first body or the second body interposed therebetween.

The body may include a first body and a second body adjacent to each other and respectively connected to the first external electrode, and each of the pair of second external electrodes may oppose the first external electrode while having the first body or the second body interposed therebetween.

Another of the first internal electrode and the second internal electrode may have a horizontal plane perpendicular to the thickness direction and an inclined plane inclined with respect to the horizontal plane in at least a partial region thereof.

The capacitor may further include a substrate on which the body is disposed.

The body may include another dielectric layer in contact with the substrate.

According to another embodiment, a manufacturing method of a multilayer capacitor includes: forming a first internal electrode having an inclination in at least a partial region thereof by disposing a shadow mask having a shield region and an open region, which are arranged in front and back, to be vertically aligned on a top of a substrate, and then performing a deposition process of the first internal electrode while relatively moving the shadow mask with respect to the substrate forward or backward; forming a dielectric layer on the first internal electrode; forming a second internal electrode having an inclination in at least a partial region thereof by disposing the shadow mask to be vertically aligned on the top of the substrate, and then performing a deposition process of the second internal electrode while relatively moving the shadow mask with respect to the substrate forward or backward; and forming another dielectric layer on the second internal electrode.

Lengths of the shield region and the open region which are arranged in front and back may each correspond to a length of a unit process section which is a section where one body formed by stacking the first internal electrode and the second internal electrode on each other is manufactured.

The shadow mask may be relatively moved by the length of the unit process section in a process of performing the deposition process to form the first internal electrode or the second internal electrode.

A position where the shadow mask is vertically aligned on the top of the substrate to form the first internal electrode or the second internal electrode may be a position where a boundary between the shield region and the open region is moved by an offset distance from a boundary of the unit process section in a relative movement direction of the shadow mask with respect to the substrate.

According to another embodiment, a multilayer capacitor includes: a body including a dielectric layer, and first and second internal electrodes stacked on each other in a thickness direction of the capacitor while being spaced apart from each other with the dielectric layer interposed therebetween, the first internal electrode extending from a first end surface of the body and the second internal electrode extending from a second end surface of the body; a first external electrode disposed on the first end surface to connect to the first internal electrode; and a second external electrode spaced apart from the first external electrode in a length direction of the capacitor, and disposed on the second end surface to connect to the second internal electrode. One of the first internal electrode and the second internal electrode has an upper surface and a lower surface having different angles with respect to one of the first end surface and the second end surface.

The embodiments of the present disclosure may provide the multilayer capacitor in which several layers of the first internal electrodes and the second internal electrodes are stacked on each other, while maintaining its smaller thickness, and the manufacturing method of the same.

The embodiments of the present disclosure may also provide the multilayer capacitor in which the first internal electrode and the second internal electrode are respectively connected to the first external electrode and the second external electrode, and effectively short-circuited from the second external electrode and the first internal electrode respectively, and the manufacturing method of the same.

DETAILED DESCRIPTION

Figure 1:
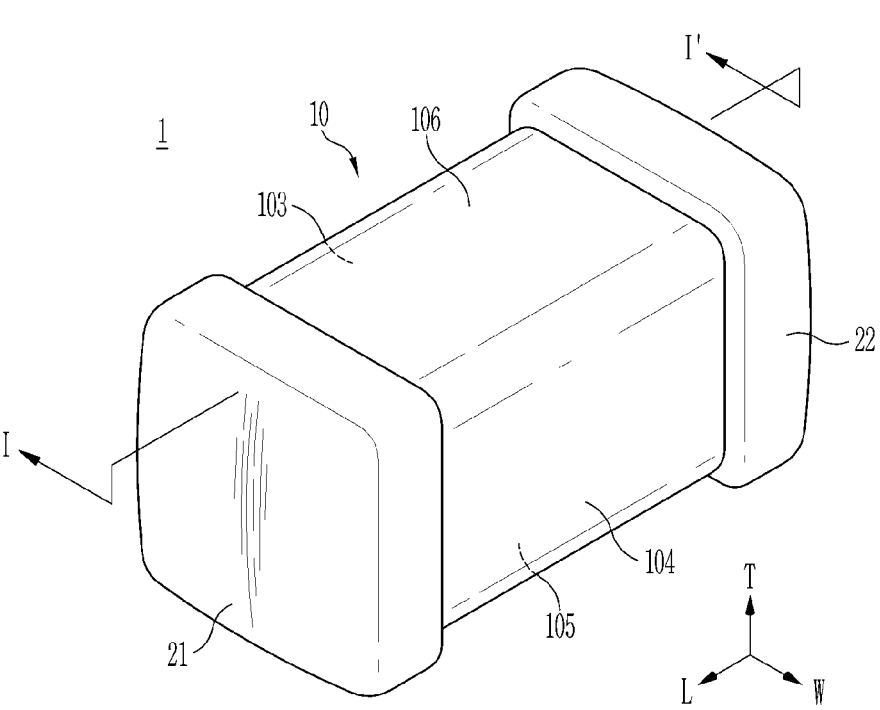
FIG. 1 is a view showing a multilayer capacitor according to a first embodiment.

Hereinafter, embodiments of the present disclosure are described in detail with reference to the accompanying drawings so that those skilled in the art to which the present disclosure pertains may easily practice the present disclosure. A portion unrelated to the description is omitted in order to obviously describe the present disclosure, and the same or similar components are denoted by the same reference numeral throughout the specification. In addition, it is to be noted that some components shown in the accompanying drawings are exaggerated, omitted or schematically shown, and the size of each component does not exactly reflect its real size.

It should be understood that the accompanying drawings are provided only to allow the embodiments of the present disclosure to be easily understood, and the spirit of the present disclosure is not limited by the accompanying drawings, and includes all the modifications, equivalents, and substitutions included in the spirit and scope of the present disclosure.

Terms including ordinal numbers such as "first," "second," and the like, may be used to describe various components. However, these components are not limited by these terms. These terms are used only to distinguish one component from another component.

In addition, when an element such as a layer, a film, a region or a substrate is referred to as being "on" or "above" another element, the element may be "directly on" another element or may have a third element interposed therebetween.

On the contrary, when an element is referred to as being "directly on" another element, there is no third element interposed therebetween.

In addition, when referred to as being "on" or "above" a reference element, an element may be disposed on or below the reference element, and may not necessarily be "on" or "above" the reference element in an opposite direction of gravity.

It should be understood that terms "include" and "comprise" used in the specification specify the presence of features, numerals, steps, operations, components, parts, or combinations thereof, mentioned in the specification, and do not preclude the presence or addition of one or more other features, numerals, steps, operations, components, parts, or combinations thereof. Unless explicitly described to the contrary, "including" any component is to be understood to imply the inclusion of another element rather than the exclusion of another component.

Further, throughout the specification, an expression "on the plane" may indicate a case where a target is viewed from the top, and an expression "on the cross section" may indicate a case where a cross section of a target taken along a vertical direction is viewed from its side.

In addition, when it is mentioned that any component is "connected" to another component, it may not only indicate that two or more components are directly connected with each other, but also indicate that two or more components are connected with each other indirectly through still another component, may not only indicate that two or more components are physically connected with each other, but also indicate that two or more components are electrically connected with each other, or two or more components are a single entity although referred to by different names based on their positions or functions.

Hereinafter, a thickness direction T refers to a direction in which components of a multilayer capacitor 1, 1a, 1 b, 1c, 1d, or 1e are stacked on each other.

In addition, a length direction L and a width direction W refer to directions respectively disposed on a plane perpendicular to the thickness direction T, and orthogonal to each other.

Here, the length direction L refers a direction in which a first external electrode 21 and a second external electrode 22 are spaced apart from each other.

In addition, a first end surface 101 and a second end surface 102 refer to surfaces opposing each other while being spaced apart from each other in the length direction L among outer surfaces of a body 10 or 10a of the multilayer capacitor 1, 1a, 1b, 1c, 1d, or 1e.

In addition, a first side surface 103 and a second side surface 104 refer to surfaces perpendicularly crossing the first end surface 101 and the second end surface 102 and opposing each other in the width direction W.

In addition, a top surface 105 and a bottom surface 106 refer to surfaces opposing each other while being spaced apart from each other in the thickness direction T.

Figure 2:
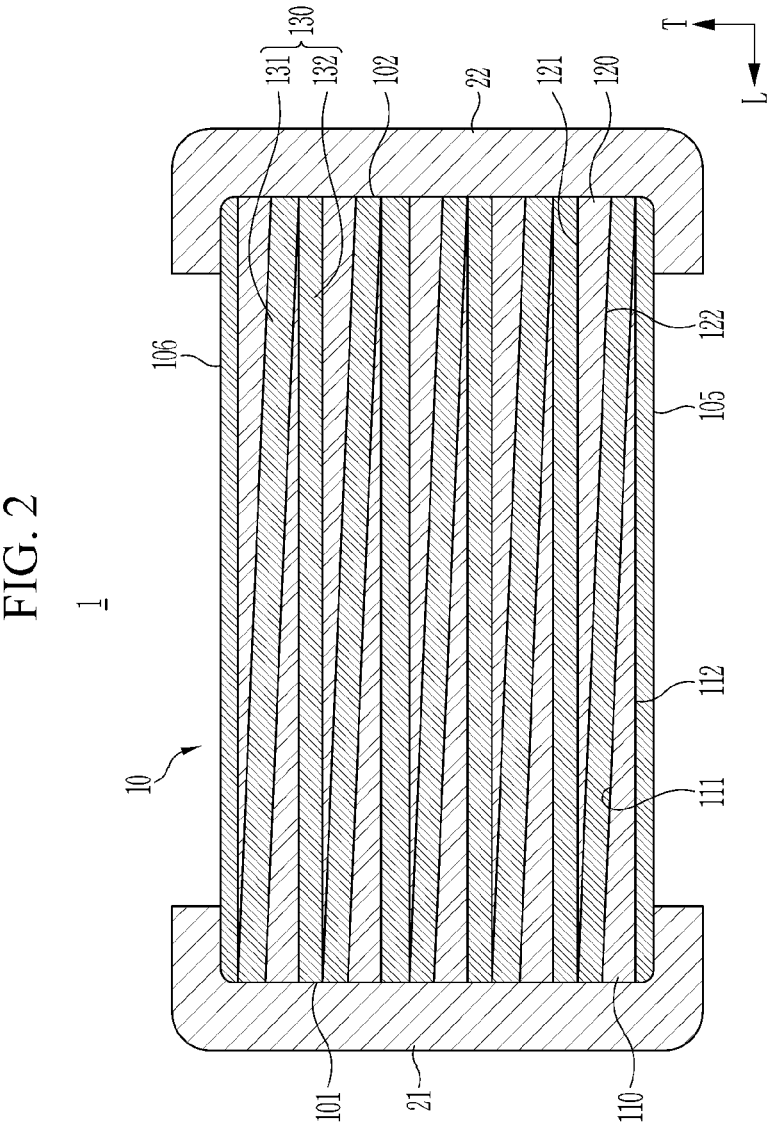
FIG. 2 is a longitudinal cross-sectional view taken along line I-I' of the multilayer capacitor of FIG. 1.

FIG. 1 is a view showing a multilayer capacitor according to a first embodiment, and FIG. 2 is a longitudinal cross-sectional view taken along line I-I' of the multilayer capacitor of FIG. 1.

Referring to FIGS. 1 and 2, the multilayer capacitor 1 according to an embodiment includes the body 10, the first external electrode 21, and the second external electrode 22.

The body 10 has a predetermined volume.

The body 10 may include a first internal electrode 110, a second internal electrode 120, and a dielectric layer 130.

The first external electrode 21 may be connected to the first internal electrode 110.

The first external electrode 21 may be connected to an end of the first internal electrode 110 toward the first end surface 101.

For example, the first external electrode 21 may be connected to the first internal electrode 110 on the first end surface 101 of the body 10.

The first external electrode 21 may be made of a conductive material.

For example, the first external electrode 21 may be made of silver (Ag), palladium (Pd), gold (Au), platinum (Pt), nickel (Ni), copper (Cu), tin (Sn), tungsten (W), titanium (Ti), or an alloy thereof.

The second external electrode 22 may be connected to the second internal electrode 120.

The second external electrode 22 may be connected to an end of the second internal electrode 120 toward the second end surface 102.

For example, the second external electrode 22 may be connected to the second internal electrode 120 on the second end surface 102 of the body 10.

The second external electrode 22 may be made of the conductive material.

For example, the second external electrode 22 may be made of silver (Ag), palladium (Pd), gold (Au), platinum (Pt), nickel (Ni), copper (Cu), tin (Sn), tungsten (W), titanium (Ti), or an alloy thereof.

The first internal electrode 110 and the second internal electrode 120 may be stacked on each other in the thickness direction T.

The first and second internal electrodes 110 and 120 may be alternately stacked on each other while being spaced apart from each other with the dielectric layer 130 interposed therebetween.

The first internal electrode 110 and the second internal electrode 120 may be made of a conductive material.

The first internal electrode 110 or the second internal electrode 120 may be made of silver (Ag), palladium (Pd), gold (Au), platinum (Pt), nickel (Ni), copper (Cu), tin (Sn), tungsten (W), titanium (Ti), molybdenum (Mo), tantalum (Ta), or an alloy thereof. The above-described material of the first internal electrode 110 or the second internal electrode 120 may be exemplary, and the first internal electrode 110 or the second internal electrode 120 may use another conductive material. The material of the first internal electrode 110 and the material of the second internal electrode 120 may be the same as each other or different from each other.

An end of the first internal electrode 110 toward the second end surface 102 may be thinner than its end toward the first end surface 101. The first internal electrode 110 may have a part having an inclined plane and becoming thicker as closer to the first external electrode 21. The first internal electrode 110 may be thinner from the first end surface 101 to the second end surface 102. An upper surface 111 of the first internal electrode 110 may be inclined downward in the length direction L from the first end surface 101 to the second end surface 102. Accordingly, a cross section of the first internal electrode 110 in the thickness direction T and the length direction L may have a triangular shape.

The upper surface 111 and lower surface 112 of the first internal electrode 110 opposing each other in the thickness direction T may have different shapes from each other. The lower surface 112 of the first internal electrode 110 may be a horizontal plane perpendicular to the thickness direction T. Accordingly, the cross section of the first internal electrode 110 in the thickness direction T and the length direction L may have a right-triangular shape.

An end of the second internal electrode 120 toward the first end surface 101 may be thinner than its end toward the second end surface 102. The second internal electrode 120 may have a part having an inclined plane and becoming thicker as closer to the second external electrode 22. The second internal electrode 120 may be thinner from the second end surface 102 to the first end surface 101. The end of the second internal electrode 120 toward the second end surface 102 may have a thickness corresponding to that of the end of the first internal electrode 110 toward the first end surface 101. A lower surface 122 of the second internal electrode 122 may be inclined upward in the length direction L from the second end surface 102 to the first end surface 101. Accordingly, a cross section of the second internal electrode 120 in the thickness direction T and the length direction L may have a triangular shape. The lower surface 122 of the second internal electrode 120 may have an inclination corresponding to that of the upper surface 111 of the first internal electrode 110.

The upper surface 121 and lower surface 122 of the second internal electrode 120 opposing each other in the thickness direction T may have different shapes from each other. The upper surface 121 of the second internal electrode 120 may be a horizontal plane perpendicular to the thickness direction T. Accordingly, the cross section of the second internal electrode 120 in the thickness direction T and the length direction L may have a right-triangular shape. A cross-sectional shape of the second internal electrode 120 may be point-symmetrical to the cross-sectional shape of the first internal electrode 110 based on their cross sections in the thickness direction T and the length direction L.

The dielectric layer 130 may be disposed between the first internal electrode 110 and the second internal electrode 120. The dielectric layer 130 may include a first dielectric layer 131 and a second dielectric layer 132.

The first dielectric layer 131 may be disposed between the upper surface 111 of the first internal electrode 110 and the lower surface 122 of the second internal electrode 120 opposing each other in the thickness direction T. The first dielectric layer 131 may be inclined downward in the length direction L from the first end surface 101 to the second end surface 102. An upper surface of the first dielectric layer 131 may be inclined downward to the second end surface 102 to correspond to the lower surface 122 of the second internal electrode 120. A lower surface of the first dielectric layer 131 may be inclined downward to the second end surface 102 to correspond to the upper surface 111 of the first internal electrode 110. The first dielectric layer 131 may have a uniform thickness in the length direction L.

The second dielectric layer 132 may be disposed between the lower surface 112 of the first internal electrode 110 and the upper surface 121 of the second internal electrode 120 opposing each other in the thickness direction T. The second dielectric layer 132 may be horizontal to be parallel to the length direction L. An upper surface of the second dielectric layer 132 may be a horizontal plane corresponding to the lower surface 112 of the first internal electrode 110. A lower surface of the second dielectric layer 132 may be a horizontal plane corresponding to the upper surface 121 of the second internal electrode 120. The second dielectric layer 132 may have a uniform thickness in the length direction L.

In the multilayer capacitor 1 according to an embodiment, the first internal electrode 110 may become thinner toward the second end surface 102 of the body 10, and have one end sharp and extremely thin toward the second end surface 102. Accordingly, when the second external electrode 22 is connected to the second internal electrode 120, one end of the first internal electrode 110 toward the second end surface 102 may be maintained to be electrically short-circuited from the second external electrode 22 even in case of being disposed adjacent to the second end surface 102 of the body 10.

In addition, in the multilayer capacitor 1 according to an embodiment, the second internal electrode 120 may become thinner toward the first end surface 101 of the body 10, and have one end sharp and extremely thin toward the first end surface 101. Accordingly, when the first external electrode 21 is connected to the first internal electrode 110, one end of the second internal electrode 120 toward the first end surface 101 may be maintained to be electrically short-circuited from the first external electrode 21 even in case of being disposed adjacent to the first end surface 101 of the body 10.

In addition, the body 10 of the multilayer capacitor 1 according to an embodiment may be thin in comparison to the number of first internal electrodes 110 and second internal electrodes 120 stacked on each other. In detail, one unit section may refer to one first internal electrode 110, one second internal electrode 120, one first dielectric layer 131 and one second dielectric layer 132 in thickness direction T. In this case, a thickness of one unit section may be less than a sum of the thicknesses of one end of the first internal electrode 110 toward the first end surface 101, one end of the second internal electrode 120 toward the second end surface 102, the first dielectric layer 131, and the second dielectric layer 132.

Figure 3:
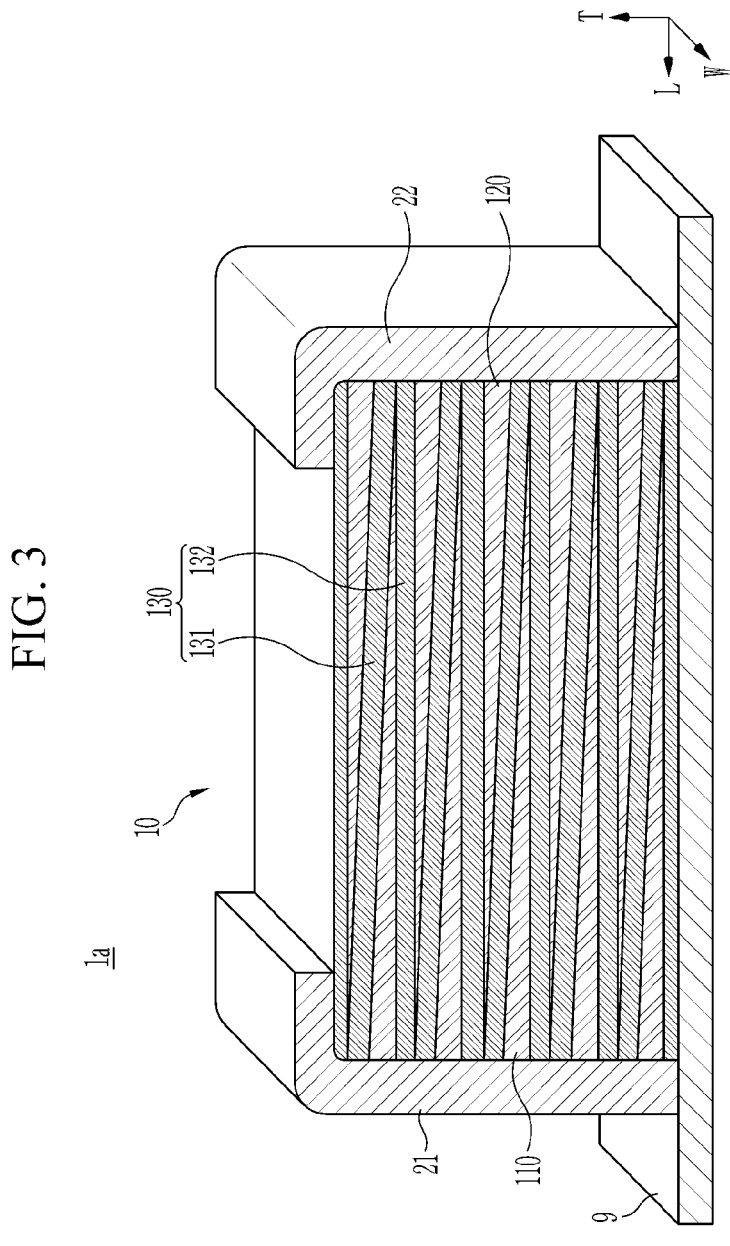
FIG. 3 is a cutaway perspective view of a multilayer capacitor according to a second embodiment.

FIG. 3 is a cutaway perspective view of a multilayer capacitor according to a second embodiment.

Referring to FIG. 3, the multilayer capacitor 1a according to the second embodiment may include a substrate 9, a body 10, a first external electrode 21, and a second external electrode 22.

The substrate 9 may have a predetermined area. The substrate 9 may be made of an insulating material. The substrate 9 may be made of a metal material, a ceramic material, a glass material, or the like. The substrate 9 may be a silicon wafer or the like.

The body 10 may be disposed on an upper surface of the substrate 9. The body 10 may include a first internal electrode 110, a second internal electrode 120, and a dielectric layer 130. The first internal electrode 110, the second internal electrode 120, and the dielectric layer 130 may correspond to those of the multilayer capacitor 1 according to the above-described first embodiment, and the description thus omits redundant descriptions thereof.

The first external electrode 21 may be connected to the first internal electrode 110. The second external electrode 22 may be connected to the second internal electrode 120. The first internal electrode 21 or the second internal electrode 22 may correspond to those of the multilayer capacitor 1 according to the above-described first embodiment, and the description thus omits redundant descriptions thereof.

Figure 4:
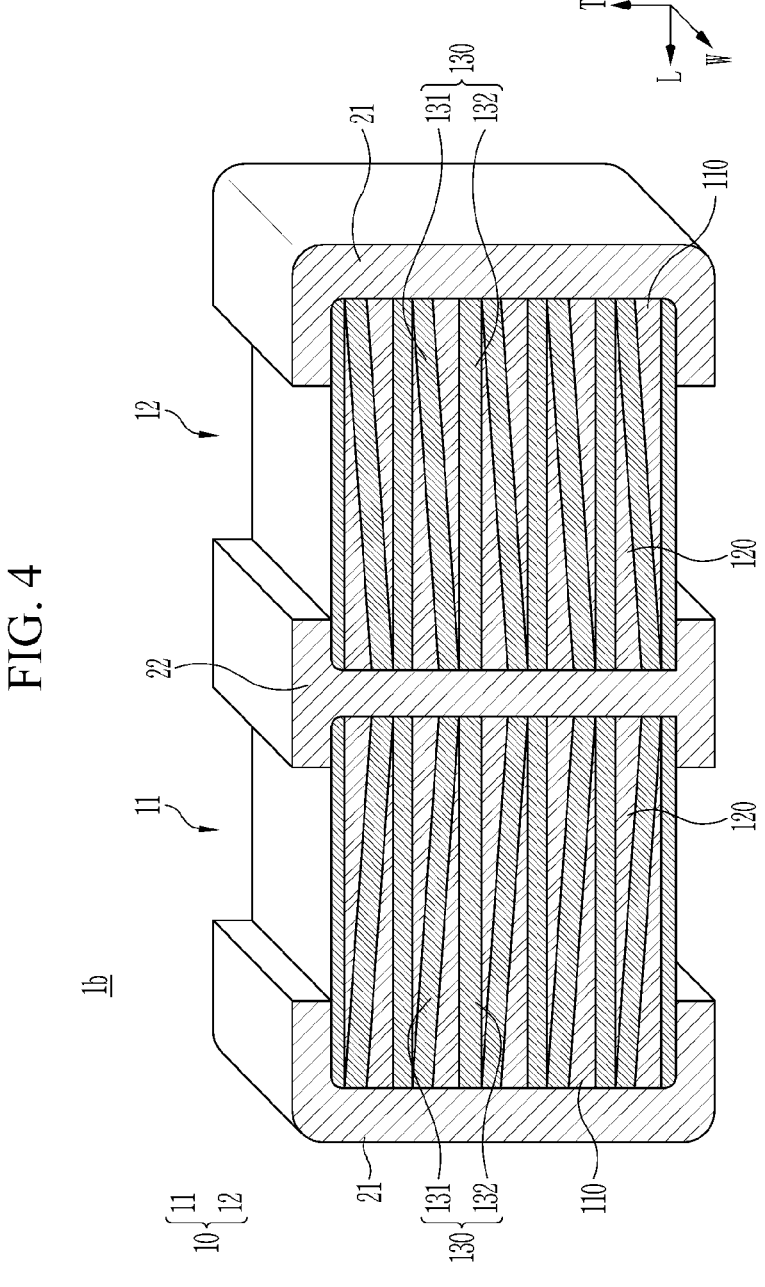
FIG. 4 is a cutaway perspective view of a multilayer capacitor according to a third embodiment.

FIG. 4 is a cutaway perspective view of a multilayer capacitor according to a third embodiment.

Referring to FIG. 4, the multilayer capacitor 1b according to the third embodiment may include a body 10, a first external electrode 21, and a second external electrode 22.

The body 10 may include a first body 11 and a second body 12. The first body 11 and the second body 12 may respectively correspond to the body 10 described above with reference to FIGS. 1 and 2, and the description thus omits redundant descriptions thereof. The first body 11 and the second body 12 may be disposed adjacent to each other. The second internal electrode 120 of the first body 11 and the second internal electrode 120 of the second body 12 may be connected to the second external electrode 22. The pair of first external electrodes 21 may be provided. Each of the first external electrodes 21 may oppose the second external electrode 22 in the length direction L while having the first body 11 or the second body 12 interposed therebetween. Each of the pair of first external electrodes 21 may be connected to the first internal electrode 110 of the first body 11 or the first internal electrode 110 of the second body 12.

Figure 5:
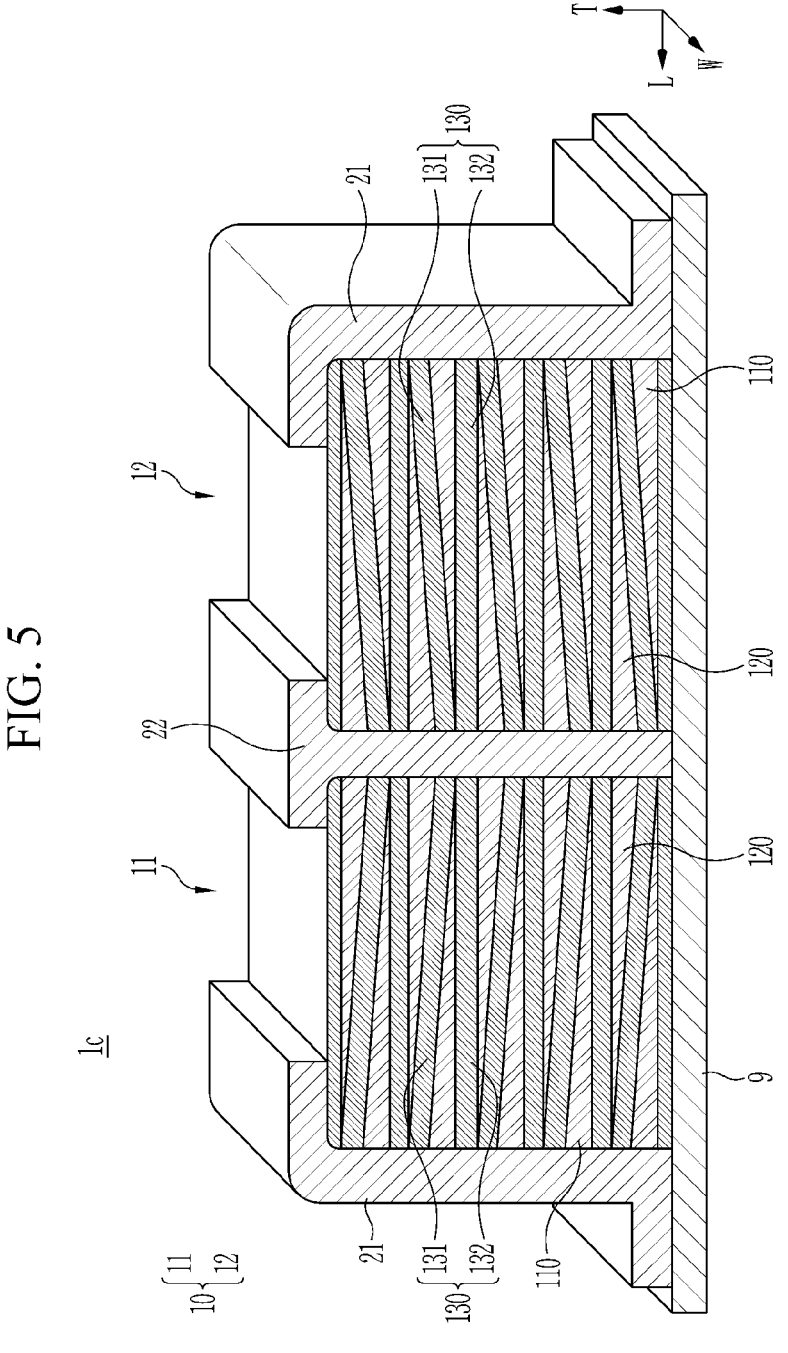
FIG. 5 is a cutaway perspective view of a multilayer capacitor according to a fourth embodiment.

FIG. 5 is a cutaway perspective view of a multilayer capacitor according to a fourth embodiment.

Referring to FIG. 5, the multilayer capacitor 1c according to the fourth embodiment may include a substrate 9, a body 10, a first external electrode 21, and a second external electrode 22.

The substrate 9 may have a predetermined area. The substrate 9 may be made of an insulating material. The substrate 9 may be made of a metal material, a ceramic material, a glass material, or the like. The substrate 9 may be a silicon wafer or the like.

The body 10 may be disposed on an upper surface of the substrate 9. The body 10 may include a first body 11 and a second body 12. The first body 11 and the second body 12 may respectively correspond to the body 10 described above with reference to FIGS. 1 and 2, and the description thus omits redundant descriptions thereof.

The first body 11 and the second body 12 may be disposed adjacent to each other. The second internal electrode 120 of the first body 11 and the second internal electrode 120 of the second body 12 may be connected to the second external electrode 22. The pair of first external electrodes 21 may be provided. Each of the first external electrodes 21 may oppose the second external electrode 22 in the length direction L while having the first body 11 or the second body 12 interposed therebetween. Each of the pair of first external electrodes 21 may be connected to the first internal electrode 110 of the first body 11 or the first internal electrode 110 of the second body 12.

Figure 6:
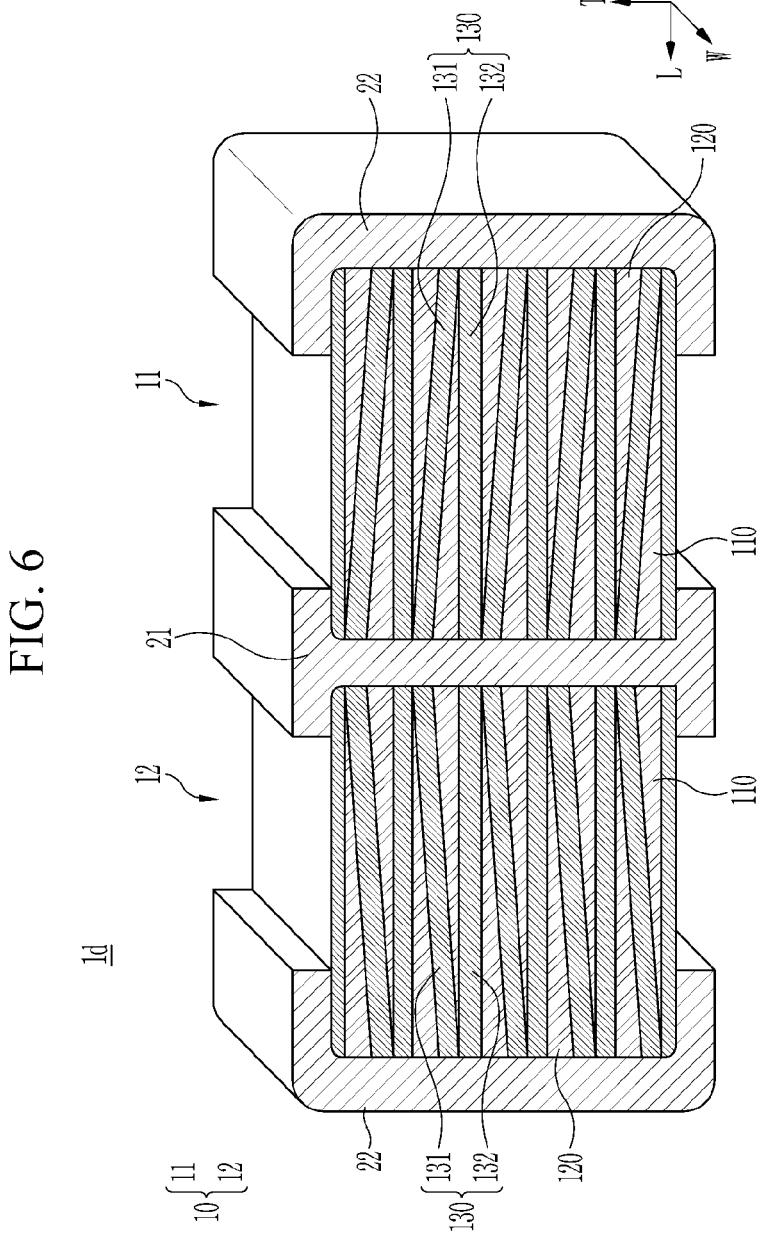
FIG. 6 is a cutaway perspective view of a multilayer capacitor according to a fifth embodiment.

FIG. 6 is a cutaway perspective view of a multilayer capacitor according to a fifth embodiment.

Referring to FIG. 6, the multilayer capacitor 1*d* according to the fifth embodiment may include a body 10, a first external electrode 21, and a second external electrode 22.

The body 10 may include a first body 11 and a second body 12. The first body 11 and the second body 12 may respectively correspond to the body 10 described above with reference to FIGS. 1 and 2, and the description thus omits redundant descriptions thereof. The first body 11 and the second body 12 may be disposed adjacent to each other. The first internal electrode 110 of the first body 11 and the first internal electrode 110 of the second body 12 may be connected to the first external electrode 21. The pair of second external electrodes 22 may be provided. Each of the second external electrodes 22 may oppose the first external electrode 21 in the length direction L while having the first body 11 or the second body 12 interposed therebetween. Each of the pair of second external electrodes 22 may be connected to the second internal electrode 120 of the first body 11 or the second internal electrode 120 of the second body 12.

Figure 7:
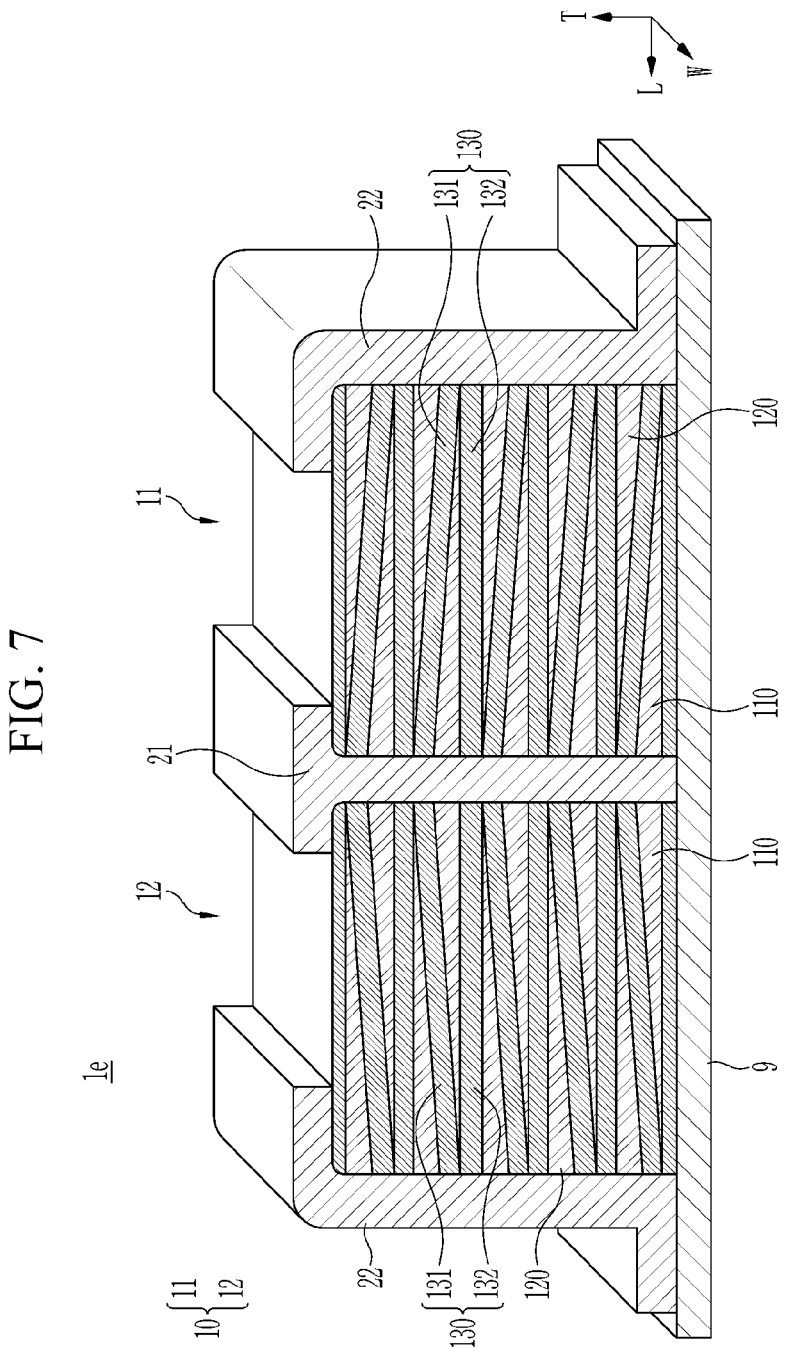
FIG. 7 is a cutaway perspective view of a multilayer capacitor according to a sixth embodiment.

FIG. 7 is a cutaway perspective view of a multilayer capacitor according to a sixth embodiment.

Referring to FIG. 7, the multilayer capacitor 1*e* according to the sixth embodiment may include a substrate 9, a body 10, a first external electrode 21, and a second external electrode 22.

The substrate 9 may have a predetermined area. The substrate 9 may be made of an insulating material. The substrate 9 may be made of a metal material, a ceramic material, a glass material, or the like. The substrate 9 may be a silicon wafer or the like.

The body 10 may be disposed on an upper surface of the substrate 9. The body 10 may include a first body 11 and a second body 12. The first body 11 and the second body 12 may respectively correspond to the body 10 described above with reference to FIGS. 1 and 2, and the description thus omits redundant descriptions thereof.

The first body 11 and the second body 12 may be disposed adjacent to each other. The first internal electrode 110 of the first body 11 and the first internal electrode 110 of the second body 12 may be connected to the first external electrode 21. The pair of second external electrodes 22 may be provided.

Each of the second external electrodes 22 may oppose the first external electrode 21 in the length direction L while having the first body 11 or the second body 12 interposed therebetween. Each of the pair of second external electrodes 22 may be connected to the second internal electrode 120 of the first body 11 or the second internal electrode 120 of the second body 12.

Figure 8:
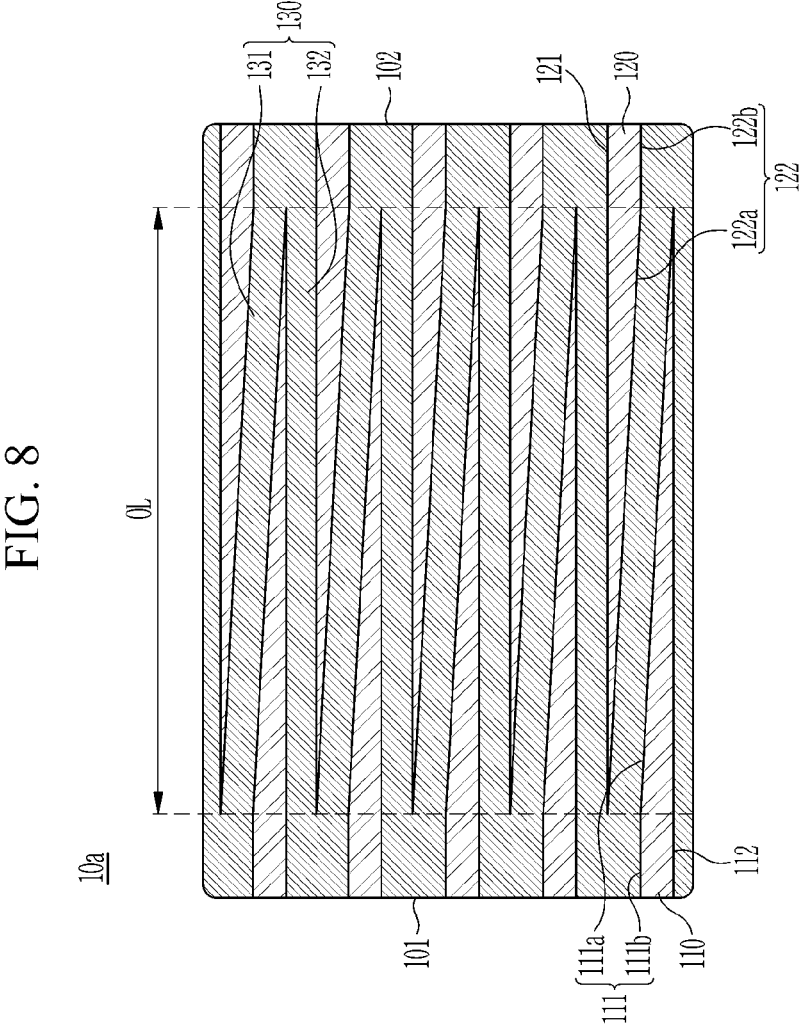
FIG. 8 is a view showing a body according to the second embodiment.

FIG. 8 is a view showing a body according to the second embodiment.

Referring to FIG. 8, the body 10*a* according to the second embodiment may include a first internal electrode 110, a second internal electrode 120, and a dielectric layer 130.

The first internal electrode 110 and the second internal electrode 120 may be alternately stacked on each other while being spaced apart from each other with the dielectric layer 130 interposed therebetween. The first internal electrode 110 and the second internal electrode 120 may be made of a conductive material.

An end of the first internal electrode 110 toward the second end surface 102 may be thinner than its end toward the first end surface 101. The first internal electrode 110 may have a part having an inclined plane in at least a partial region thereof and becoming thicker as closer to the first end surface 101. The upper surface 111 and lower surface 112 of the first internal electrode 110 opposing each other in the thickness direction T may have different shapes from each other. One end of the first internal electrode 110 toward the second end surface 102 may be spaced apart from the second end surface 102 toward the first end surface 101 by a predetermined distance. The upper surface 111 of the first internal electrode 110 may include a first inclined part 111*a* and a first horizontal part 111*b*. The first inclined part 111*a* may be disposed in a region of the first internal electrode 110 toward the second end surface 102. The first inclined part 111*a* may be inclined downward toward the second end surface 102. Accordingly, the region of the first internal electrode 110 toward the second end surface 102 may become thinner toward the second end surface 102. The first inclined part 111*a* may be disposed in a region OL where the first internal electrode 110 opposes the second internal electrode 120 in the thickness direction T. A cross section of the region of the first internal electrode 110 toward the second end surface 102 in the thickness direction T and the length direction L may have a triangular shape. The first horizontal part 111*b* may be disposed in a region of the first internal electrode 110 toward the first end surface 101. The first horizontal part 111*b* may be disposed outside the region OL where the first internal electrode 110 opposes the second internal electrode 120 in the thickness direction T. The first horizontal part 111*b* may be a horizontal plane perpendicular to the thickness direction T.

The lower surface 112 of the first internal electrode 110 may be a horizontal plane perpendicular to the thickness direction T. Accordingly, a cross section of the region of the first internal electrode 110 toward the second end surface 102 in the thickness direction T and the length direction L may have a right-triangular shape. The region of the first internal electrode 110 toward the first end surface 101 may have uniform upper and lower thicknesses in the length direction L.

An end of the second internal electrode 120 toward the first end surface 101 may be thinner than its end toward the second end surface 102. The second internal electrode 120 may have a part having an inclined plane in at least a partial region thereof and becoming thicker as closer to the second end surface 102. The upper surface 121 and lower surface 122 of the second internal electrode 120 opposing each other in the thickness direction T may have different shapes from each other.

One end of the second internal electrode 120 toward the first end surface 101 may be spaced apart from the first end surface 101 toward the second end surface 102 by a predetermined distance.

The lower surface 122 of the second internal electrode 120 may include a second inclined part 122a and a second horizontal part 122b. The second inclined part 122a may be disposed in a region of the second internal electrode 120 toward the first end surface 101. The second inclined part 122a may be inclined upward toward the first end surface 101. Accordingly, the region of the second internal electrode 120 toward the first end surface 101 may become thinner toward the first end surface 101. A cross section of the region of the second internal electrode 120 toward the first end surface 102 in the thickness direction T and the length direction L may have a triangular shape. The second inclined part 122a may be disposed in the region OL where the second internal electrode 120 opposes the first internal electrode 110 in the thickness direction T.

The second inclined part 122a may be aligned with the first inclined part 111a in the thickness direction T. An inclination of the second inclined part 122a may correspond to an inclination of the first inclined part 111a.

The second horizontal part 122b may be disposed in a region of the second internal electrode 120 toward the second end surface 102. The second horizontal part 122b may be disposed outside the region OL where the second internal electrode 120 opposes the first internal electrode 110 in the thickness direction T. The second horizontal part 122b may be a horizontal plane perpendicular to the thickness direction T.

The upper surface 121 of the second internal electrode 120 may be a horizontal plane perpendicular to the thickness direction T. Accordingly, a cross section of the region of the second internal electrode 120 toward the first end surface 101 in the thickness direction T and the length direction L may have a right-triangular shape. The region of the second internal electrode 120 toward the second end surface 102 may have a uniform thickness in the length direction L.

The dielectric layer 130 may be disposed between the first internal electrode 110 and the second internal electrode 120. The dielectric layer 130 may include a first dielectric layer 131 and a second dielectric layer 132.

The first dielectric layer 131 may be disposed between the upper surface 111 of the first internal electrode 110 and the lower surface 122 of the second internal electrode 120 opposing each other in the thickness direction T. The first dielectric layer 131 may be disposed between the first inclined part 111a of the first internal electrode 110 and the second inclined part 122a of the second internal electrode 120. The first dielectric layer 131 may be inclined downward toward the second end surface 102 in the length direction L. The upper surface of the first dielectric layer 131 may be inclined downward toward the second end surface 102 to correspond to the second inclined part 122a. The lower surface of the first dielectric layer 131 may be inclined downward toward the second end surface 102 to correspond to the first inclined part 111a. The first dielectric layer 131 may have a uniform thickness in the thickness direction T along the length direction L.

The second dielectric layer 132 may be disposed between the lower surface 112 of the first internal electrode 110 and the upper surface 121 of the second internal electrode 120 opposing each other in the thickness direction T. The second dielectric layer 132 may be horizontal to be parallel to the length direction L. An upper surface of the second dielectric layer 132 may be a horizontal plane corresponding to the lower surface 112 of the first internal electrode 112. A lower surface of the second dielectric layer 132 may be a horizontal plane corresponding to the upper surface 121 of the second internal electrode 120. The second dielectric layer 132 may have a uniform thickness in the thickness direction T along the length direction L.

The first external electrode 21 may be connected to the region of the first internal electrode 110 toward the first end surface 101. For example, the first external electrode 21 may be connected to the first internal electrode 110 on the first end surface 101 of the body 10. The first external electrode 21 may be made of a conductive material.

The second external electrode 22 may be connected to the region of the second internal electrode 120 toward the second end surface 102. For example, the second external electrode 22 may be connected to the second internal electrode 120 on the second end surface 102 of the body 10. The first external electrode 21 may be made of a conductive material.

In the body 10a according to the second embodiment, one end of the first internal electrode 110 may be sharp and extremely thin toward the second end surface 102. Accordingly, the first internal electrode 110 may be effectively maintained to be electrically short-circuited from the second external electrode 22.

In addition, in the body 10a according to the second embodiment, one end of the second internal electrode 120 may be sharp and extremely thin toward the first end surface 101. Accordingly, the second internal electrode 120 may be effectively maintained to be electrically short-circuited from the first external electrode 21.

In addition, the body 10a according to the second embodiment may be thin in comparison to the number of first internal electrodes 110 and second internal electrodes 120 stacked on each other.

The body 10a according to the second embodiment may be applied to the multilayer capacitor 1, 1a, 1b, 1c, 1d and 1e according to the first to sixth embodiments described above with reference to FIGS. 1 to 7. In addition, the multilayer capacitors 1b, 1c, 1d, and 1e according to the third to sixth embodiments may respectively use one body 10 described above with reference to FIG. 2 and one body 10a according to the second embodiment.

In the description hereinafter provided with reference to FIGS. 9 through 28, the rear refers to the left side of the drawings, and the front refers to the right side of the drawings. In addition, a unit process section U.P. refers to a section where the first internal electrode 110 and the second internal electrode 120 are stacked on each other in the length direction L to produce one body 10 or 10a.

FIGS. 9 to 14 are views showing a manufacturing method of the multilayer capacitor according to the first embodiment.

Hereinafter, the description describes the manufacturing method of the multilayer capacitor according to the first embodiment with reference to FIGS. 9 to 14.

Figure 9:
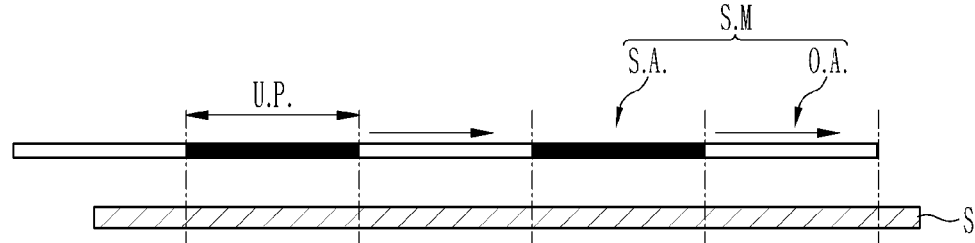
FIGS. 9 to 14 are views showing a manufacturing method of the multilayer capacitor according to the first embodiment.

Referring to FIG. 9, a shadow mask S.M for depositing the first internal electrode 110 may be aligned and disposed on the top of a substrate S. The substrate S may have the dielectric layer 130 formed on its upper surface, or its upper surface may be exposed upward without the dielectric layer 130. The shadow mask S.M may include at least one shield region S.A. and at least one open region O.A. arranged in the length direction L. The shield region S.A. and the open region O.A. may be disposed alternately with each other. A length of the shield region S.A. in the length direction L and a length of the open region O.A. in the length direction L may correspond to a length of the unit process section U.P. The rear end of the shield region S.A. and the rear end of the open region O.A. may be vertically aligned with the rear end of the unit process section U.P.

Figure 10:
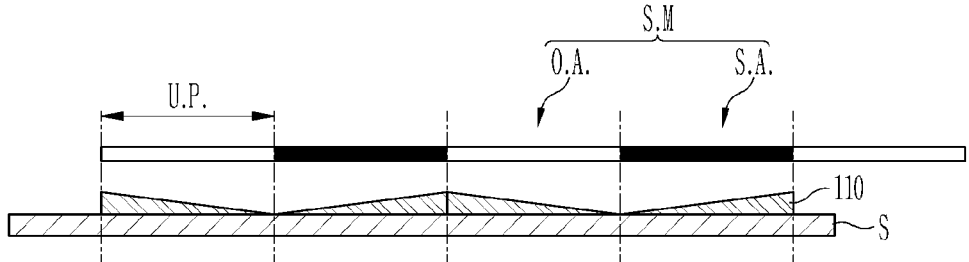

Referring to FIG. 10, deposition of the first internal electrode 110 may be performed while the shadow mask S.M is relatively moved forward with respect to the substrate S. Relative forward movement may indicate that the shadow mask S.M is moved forward, the substrate S is moved backward, or the shadow mask S.M is moved forward while substrate S is moved backward. The deposition of the first internal electrode 110 may be performed while the shadow mask S.M is moved by the length of the unit process section U.P. The first internal electrode 110 may be deposited to have an inclined upper surface. One first internal electrode 110 may be formed for each unit process section U.P.

Figure 11:
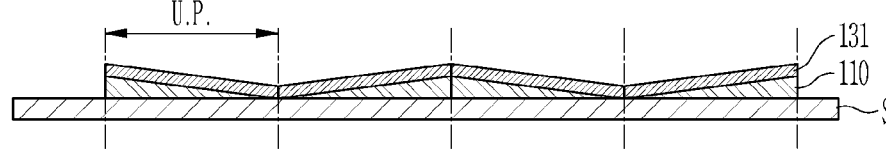

Referring to FIG. 11, the dielectric layer 130 may be formed. The dielectric layer may be formed to a uniform thickness through a deposition process. Accordingly, the first dielectric layer 131 may be formed on the first internal electrode 110.

Figure 12:
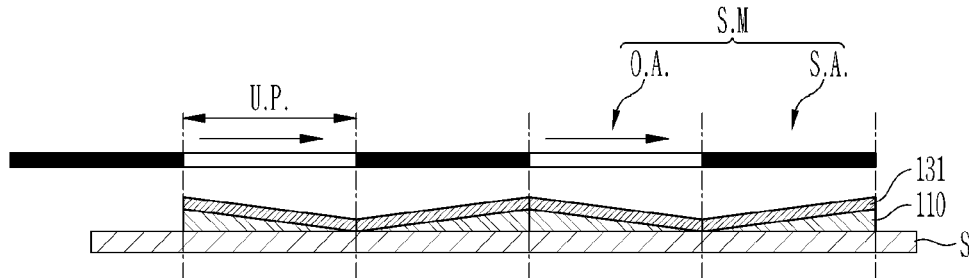

Referring to FIG. 12, the shadow mask S.M for depositing the second internal electrode 120 may be aligned and disposed on the top of the substrate S. The shield region S.A. may be disposed in a region where the open region O.A. is disposed in a step of depositing the first internal electrode 110, and the open region O.A. may be disposed in a region where the shield region S.A. is disposed in the step of depositing the first internal electrode 110.

Figure 13:
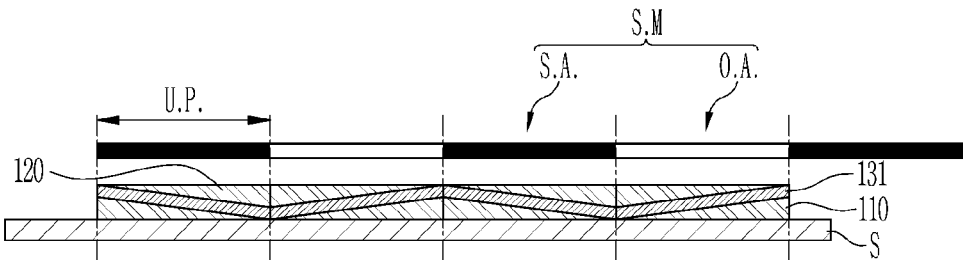

Referring to FIG. 13, deposition of the second internal electrode 120 may be performed while the shadow mask S.M is relatively moved forward with respect to the substrate S. The deposition of the second internal electrode 120 may be performed while the shadow mask S.M is relatively moved by the length of the unit process section U.P. The second internal electrode 120 may be deposited to have the inclined lower surface 122. The upper surface 121 of the second internal electrode 120 may have the horizontal plane shape. One second internal electrode 120 may be formed for each unit process section U.P.

Figure 14:
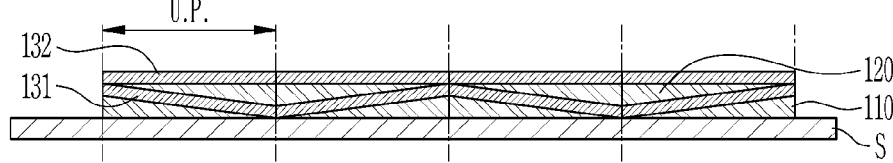

Referring to FIG. 14, the dielectric layer 130 may be formed. The dielectric layer 130 may be formed to a uniform thickness through the deposition process. Accordingly, the second dielectric layer 132 may be formed on the second internal electrode 120.

The body 10 in which the first internal electrode 110 and the second internal electrode 120 are vertically stacked on each other may be manufactured in each unit process section U.P. when the deposition of the first internal electrode 110, the formation of the dielectric layer 130, the deposition of the second internal electrode 120, and the formation of the dielectric layer 130, as described above, are repeated two or more times. Next, manufacturing of the multilayer capacitor 1 may be completed when the first external electrode 21 and the second external electrode 22 are respectively connected to the first internal electrode 110 and the second internal electrode 120.

According to the manufacturing method of the multilayer capacitor according to the first embodiment, the body 10 may be manufactured through the deposition process. Accordingly, it is possible to manufacture the multilayer capacitor 1, 1a, 1b, 1c, 1d, or 1e in which the first internal electrode 110 and the second internal electrode 120 each having a finer structure are stacked on each other at high density.

Figure 15:
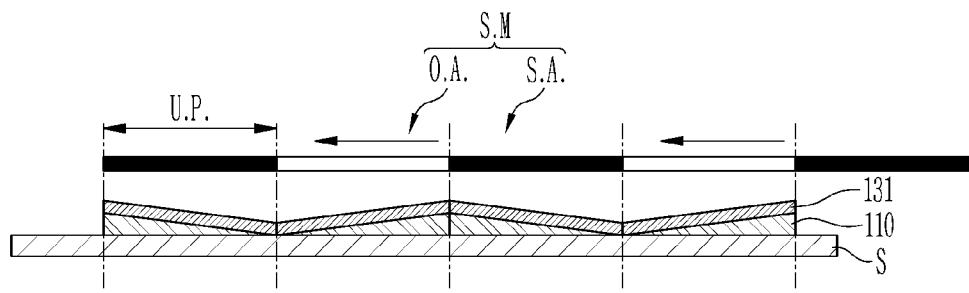
FIGS. 15 and 16 are views showing a manufacturing method of the multilayer capacitor according to the second embodiment.
Figure 16:
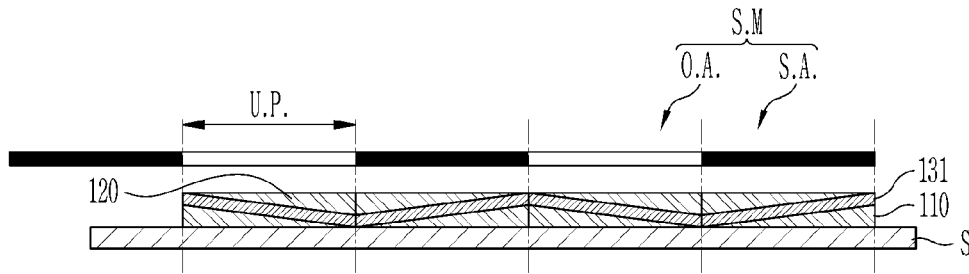

FIGS. 15 and 16 are views showing a manufacturing method of the multilayer capacitor according to the second embodiment.

The shadow mask S.M for depositing the first internal electrode 110 may be aligned and disposed on the top of the substrate S, and deposition of the first internal electrode 110 may then be performed while the shadow mask S.M is relatively moved forward with respect to the substrate S. The dielectric layer 130 may then be formed. Detailed processes are the same as those of FIGS. 9 to 11, and the description thus omits redundant descriptions thereof.

Hereinafter, the description describes the manufacturing method of the multilayer capacitor according to the second embodiment with reference to FIGS. 15 and 16.

Referring to FIG. 15, the shadow mask S.M for depositing the second internal electrode 120 may be aligned and disposed on the top of the substrate S. The shield region S.A. and the open region O.A. may each be disposed at the same position as when the deposition of the first internal electrode 110 begins.

Referring to FIG. 16, deposition of the second internal electrode 120 may be performed while the shadow mask S.M is relatively moved backward with respect to the substrate S. The deposition of the second internal electrode 120 may be performed while the shadow mask S.M is relatively moved by the length of the unit process section U.P. One second internal electrode 120 may be formed for each unit process section U.P.

The dielectric layer 130 may then be formed. A method of forming the dielectric layer 130 is the same as that of FIG. 14, and the description thus omits redundant description thereof.

The body 10 in which the first internal electrode 110 and the second internal electrode 120 are vertically stacked on each other may be manufactured in each unit process section U.P. when the deposition of the first internal electrode 110, the formation of the dielectric layer 130, the deposition of the second internal electrode 120, and the formation of the dielectric layer 130, as described above, are repeated two or more times. Next, manufacturing of the multilayer capacitor 1, 1a, 1b, 1c, 1d, or 1e may be completed when the first external electrode 21 and the second external electrode 22 are respectively connected to the first internal electrode 110 and the second internal electrode 120.

According to the manufacturing method of the multilayer capacitor according to the second embodiment, the body 10 of the multilayer capacitor 1, 1a, 1b, 1c, 1d, or 1e may be manufactured through the deposition process. Accordingly, it is possible to manufacture the multilayer capacitor 1, 1a, 1b, 1c, 1d, or 1e in which the first internal electrode 110 and the second internal electrode 120 each having a finer structure are stacked on each other at high density.

FIGS. 17 to 22 are views showing a manufacturing method of the multilayer capacitor according to the third embodiment.

Hereinafter, the description describes the manufacturing method of the multilayer capacitor according to the third embodiment with reference to FIGS. 17 and 22.

Figure 17:
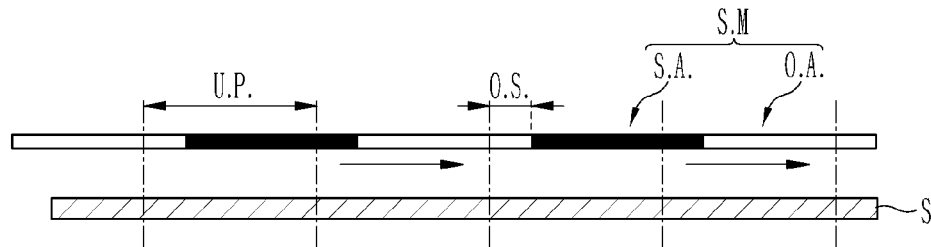
FIGS. 17 to 22 are views showing a manufacturing method of the multilayer capacitor according to the third embodiment.

Referring to FIG. 17, the shadow mask S.M for depositing the first internal electrode 110 may be aligned and disposed on the top of the substrate S. The substrate S may have the dielectric layer 130 formed on its upper surface, or its upper surface may be exposed upward without the dielectric layer 130. The shadow mask S.M may include at least one shield region S.A. and at least one open region O.A. arranged in the length direction L. The shield region S.A. and the open region O.A. may be disposed alternately with each other. A length of the shield region S.A. in the length direction L and a length of the open region O.A. in the length direction L may each correspond to a length of the unit process section U.P. A boundary between the shield region S.A. and the open region O.A. may be disposed by being moved forward, which is a relative movement direction of the shadow mask S.M, by an offset distance O.S. from a boundary of the unit process section U.P. The offset distance O.S. may be less than half the length of the unit process section U.P.

Figure 18:
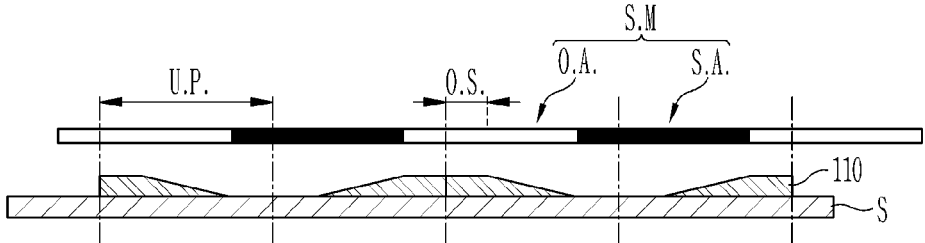

Referring to FIG. 18, deposition of the first internal electrode 110 may be performed while the shadow mask S.M is moved relatively forward with respect to the substrate S. Relative forward movement may indicate that the shadow mask S.M is moved forward, the substrate S is moved backward, or the shadow mask S.M is moved forward while the substrate S is moved backward. The deposition of the first internal electrode 110 may be performed while the shadow mask S.M is moved by a distance shorter than the length of the unit process section U.P. When the deposition of the first internal electrode 110 and the movement of the shadow mask S.M are completed, the boundary between the shield region S.A. and the open region O.A. may be disposed at a point spaced by a predetermined distance backward from the boundary of the unit process section U.P. A movement distance of the shadow mask S.M. may have a value obtained by subtracting twice the offset distance O.S. from the length of the unit process section U.P. The upper surface 111 of the first internal electrode 110 may be deposited to have the first inclined part 111*a*, the first horizontal part 111*b*, and have an inclination in a partial region. The first internal electrode 110 may not be deposited in a section where the first inclined parts 111*a* oppose each other. One first internal electrode 110 may be formed for each unit process section U.P.

Figure 19:
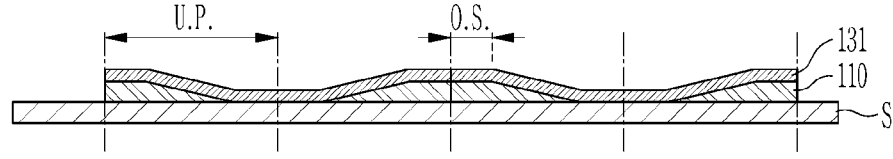

Referring to FIG. 19, the dielectric layer 130 may be formed. The dielectric layer may be formed to a uniform thickness through the deposition process. Accordingly, the first dielectric layer 131 may be formed on the first internal electrode 110.

Figure 20:
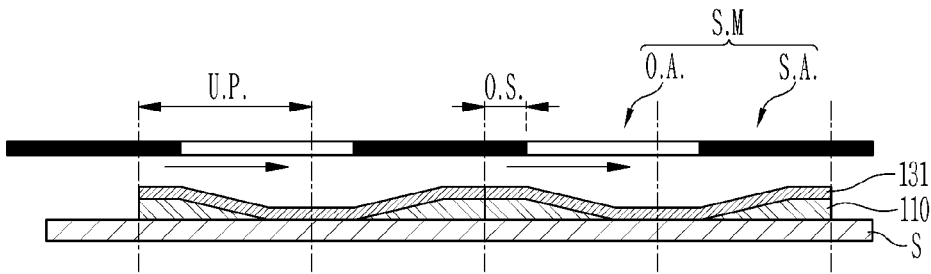

Referring to FIG. 20, the shadow mask S.M for depositing the second internal electrode 120 may be aligned and disposed on the top of the substrate S. The shield region S.A. may be disposed in a region where the open region O.A. is disposed in a step of depositing the first internal electrode 110, and the open region O.A. may be disposed in a region where the shield region S.A. is disposed in the step of depositing the first internal electrode 110. The front end of the shield region S.A. and the front end of the open region O.A. may be disposed while being moved forward by the offset distance O.S. from the boundary of the unit process section U.P.

Figure 21:
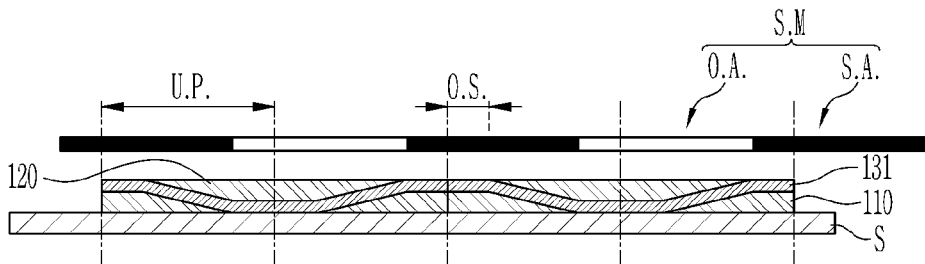

Referring to FIG. 21, deposition of the second internal electrode 120 may be performed while the shadow mask S.M is relatively moved forward with respect to the substrate S. The deposition of the second internal electrode 120 may be performed while the shadow mask S.M is relatively moved by the distance shorter than the length of the unit process section U.P. When the deposition of the second internal electrode 120 and the movement of the shadow mask S.M are completed, the boundary between the shield region S.A. and the open region O.A. may be disposed at a point spaced by a predetermined distance backward from the boundary of the unit process section U.P. A movement distance of the shadow mask S.M. may have a value obtained by subtracting twice the offset distance O.S. from the length of the unit process section U.P. The lower surface 122 of the second internal electrode 120 may be deposited to have the second inclined part 122*a*, the second horizontal part 122*b*, and have an inclination in a partial region. One second internal electrode 120 may be formed for each unit process section U.P. The second internal electrode 120 may not be deposited in a section where the second inclined parts 122*a* oppose each other.

Figure 22:
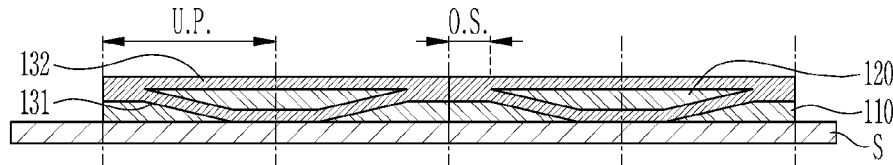

Referring to FIG. 22, the dielectric layer 130 may be formed. The dielectric layer 130 may be formed to a uniform thickness through the deposition process. Accordingly, the second dielectric layer 132 may be formed on the second internal electrode 120.

In addition, as in the manufacturing method of the multilayer capacitor according to the second embodiment, the shadow mask S.M for depositing the second internal electrode 120 may be disposed at the same position as when the deposition of the first internal electrode 110 begins. Next, the deposition of the second internal electrode 120 may be performed while the shadow mask S.M is relatively moved backward with respect to the substrate S.

The body 10 or 10*a* in which the first internal electrode 110 and the second internal electrode 120 are vertically stacked on each other may be manufactured in each unit process section U.P. when the deposition of the first internal electrode 110, the formation of the dielectric layer 130, the deposition of the second internal electrode 120, and the formation of the dielectric layer 130, as described above, are repeated two or more times. Next, manufacturing of the multilayer capacitor 1*a*, 1*b*, 1*c*, 1*d*, or 1*e* may be completed when the first external electrode 21 and the second external electrode 22 are respectively connected to the first internal electrode 110 and the second internal electrode 120.

According to the manufacturing method of the multilayer capacitor according to the second embodiment, the body 10 or 10*a* of the multilayer capacitor 1*a*, 1*b*, 1*c*, 1*d*, or 1*e* may be manufactured through the deposition process. Accordingly, it is possible to manufacture the multilayer capacitor 1*a*, 1*b*, 1*c*, 1*d*, or 1*e* in which the first internal electrode 110 and the second internal electrode 120 each having a finer structure are stacked on each other at high density.

According to the manufacturing method of the multilayer capacitor according to the second embodiment, the body 10*a* according to the second embodiment may be manufactured through the deposition process. In addition, the body 10 described above may be manufactured in the multilayer capacitor 1 according to the first embodiment by removing the region where the first horizontal part 111*b* and the second horizontal part 122*b* are formed.

Figure 23:
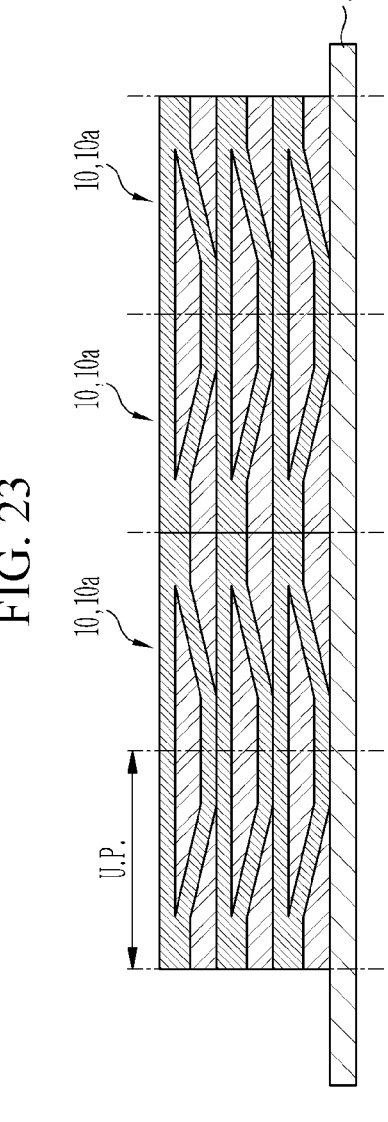
FIGS. 23 to 25 are views showing a manufacturing method of the multilayer capacitor according to the fourth embodiment.
Figure 24:
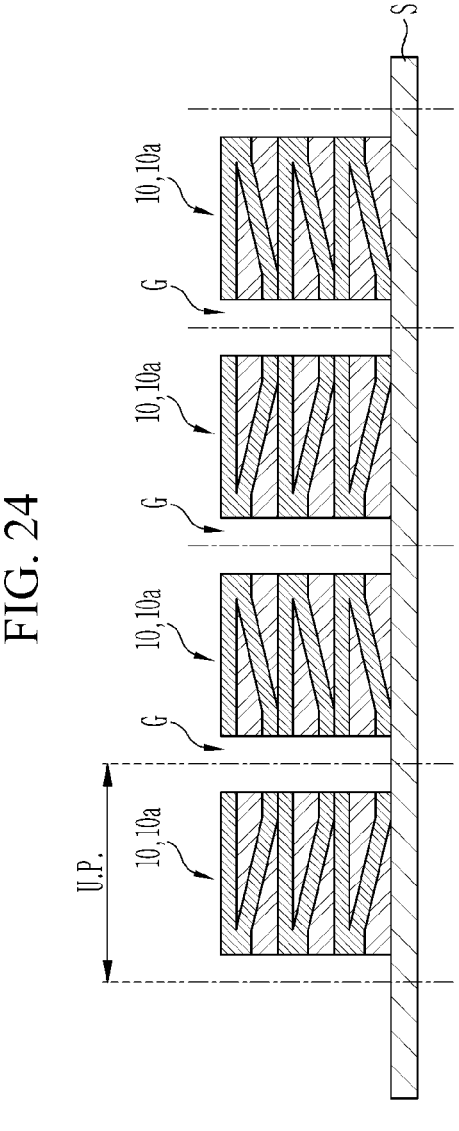
Figure 25:
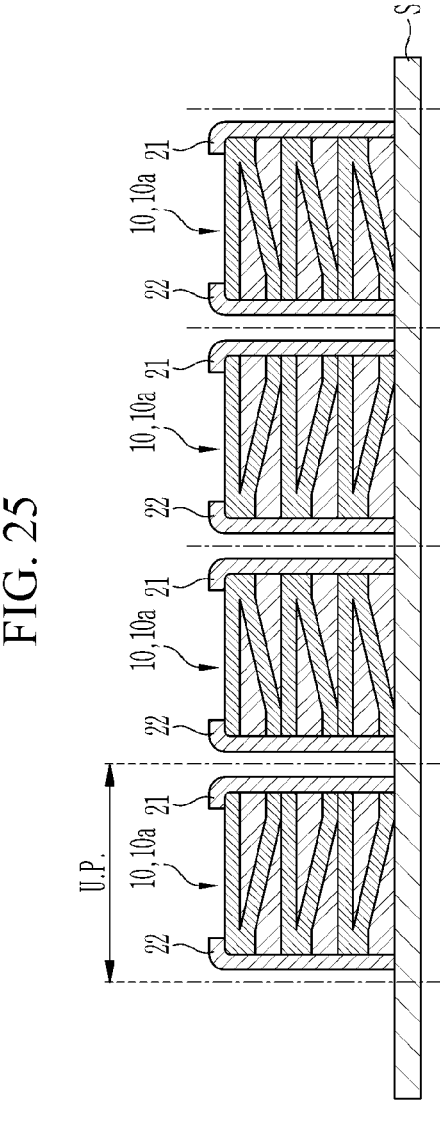

FIGS. 23 to 25 are views showing a manufacturing method of the multilayer capacitor according to the fourth embodiment.

Hereinafter, the description describes the manufacturing method of the multilayer capacitor according to the fourth embodiment with reference to FIGS. 23 to 25.

Referring to FIG. 23, the plurality of bodies 10 or 10*a* may be provided. The plurality of bodies 10 or 10*a* may be connected to each other. The plurality of bodies 10 or 10*a* may be disposed on an upper surface of the substrate S. The bodies 10 or 10*a* may each be manufactured by the manufacturing method of the multilayer capacitor according to the third embodiment, and disposed in the unit process section U.P.

Referring to FIG. 24, a groove G may be formed. The groove G may be formed in a region where the bodies 10 or 10*a* are connected to each other to separate the bodies 10 or 10a from each other. The groove G may include a region where the boundary of the unit process section U.P. is disposed. A depth of the groove G may correspond to a thickness of the body 10 or 10a. The groove G may be formed through a cutting process using a laser or a mechanical cutter. Alternatively, the groove G may be formed through an etching process.

Referring to FIG. 25, the first external electrode 21 and the second external electrode 22 may be formed in each of the bodies 10 or 10a. The first external electrode 21 may be connected to the first internal electrode 110 of the body 10 or 10a, and the second external electrode 22 may be connected to the second internal electrode 120 of the body 10 or 10a. The first external electrode 21 or the second external electrode 22 may be formed through the deposition process. A mask may be used for the deposition of the first external electrode 21 or the second external electrode 22.

Figure 26:
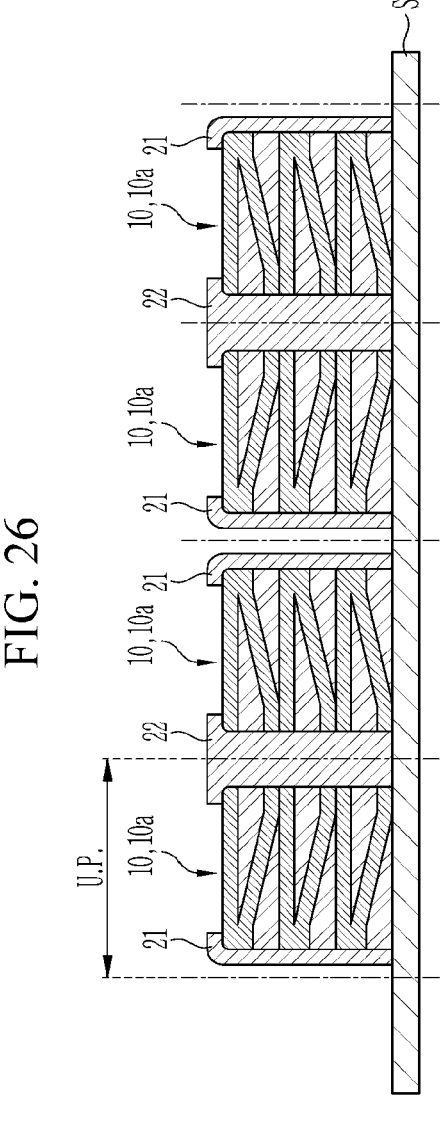
FIG. 26 is a view showing a manufacturing method of the multilayer capacitor according to the fifth embodiment.

FIG. 26 is a view showing a manufacturing method of the multilayer capacitor according to the fifth embodiment.

The groove G may be formed in the plurality of bodies 10 or 10a. The formation of the plurality of bodies 10 or 10a and the groove G is the same as the manufacturing method of the multilayer capacitor according to the fourth embodiment, and the description thus omits redundant descriptions thereof.

Referring to FIG. 26, the first external electrode 21 and the second external electrode 22 may be formed. The second external electrode 22 may be formed between the bodies 10 or 10a adjacent to each other, and each side of the second external electrode 22 may thus be connected to the second internal electrode 120 of the adjacent body 10 or 10a. The first external electrode 21 is formed on a side of the body 10 or 10a that is opposite to its side where the second external electrode 22 is formed. The first external electrode 21 may be connected to the first internal electrode 110 of the body 10 or 10a.

For another example, the first external electrode 21 may be formed between the bodies 10 or 10a adjacent to each other, and each side of the first external electrode 21 may thus be connected to the first internal electrode 110 of the adjacent body 10 or 10a. The second external electrode 22 may be formed on a side of the body 10 or 10a that is opposite to its side where the first external electrode 21 is formed. The second external electrode 22 may be connected to the second internal electrode 120 of the body 10 or 10a.

While the present disclosure has been described in connection with what is presently considered to be practical embodiments, it is to be understood that the present disclosure is not limited to the disclosed embodiments. On the contrary, it is intended to cover various modifications and equivalent arrangements included within the spirit and scope of the appended claims.

What is claimed is:

1. A multilayer capacitor comprising:
a body including a dielectric layer, and first and second internal electrodes stacked on each other in a thickness direction of the capacitor while being spaced apart from each other with the dielectric layer interposed therebetween;
a first external electrode connected to the first internal electrode; and
a second external electrode spaced apart from the first external electrode in a length direction of the capacitor that is perpendicular to the thickness direction, and connected to the second internal electrode,
wherein one of the first internal electrode and the second internal electrode has a horizontal plane perpendicular to the thickness direction and an inclined plane inclined with respect to the horizontal plane in at least a partial region thereof,
an upper surface of the first internal electrode includes a first portion inclined downward in the length direction from the first external electrode toward the second external electrode, and a second portion closer to the first external electrode than the first portion,
a degree of inclination in the length direction of the first portion is greater than that of the second portion.

2. The capacitor of claim 1, wherein
a portion of a lower surface of the second internal electrode is inclined upward in the length direction from the second external electrode toward the first external electrode.

3. The capacitor of claim 1, wherein the first internal electrode and the second internal electrode are point-symmetrical to each other based on their cross sections in the thickness direction and the length direction.

4. The capacitor of claim 1, wherein an upper surface of the first internal electrode includes:
a first inclined part disposed in a region where the first internal electrode opposes the second internal electrode in the thickness direction and including the first portion, and
a first horizontal part disposed outside the region where the first internal electrode opposes the second internal electrode in the thickness direction and including the second portion.

5. The capacitor of claim 1, wherein a lower surface of the second internal electrode includes:
a second inclined part disposed in a region where the second internal electrode opposes the first internal electrode in the thickness direction and including the first portion, and
a second horizontal part disposed outside the region where the second internal electrode opposes the first internal electrode in the thickness direction and including the second portion.

6. The capacitor of claim 1, wherein the dielectric layer includes:
a first dielectric layer disposed between an upper surface of the first internal electrode and a lower surface of the second internal electrode opposing each other in the thickness direction, and inclined in the length direction, and
a second dielectric layer disposed between a lower surface of the first internal electrode and an upper surface of another second internal electrode opposing each other in the thickness direction, and parallel to the length direction.

7. The capacitor of claim 6, wherein a portion of the first dielectric layer or the second dielectric layer overlapping the first portion in the thickness direction has a uniform thickness between the first internal electrode and the second internal electrode in the length direction.

8. The capacitor of claim 1, wherein the body includes a first body and a second body adjacent to each other and respectively connected to the second external electrode, and each of the pair of first external electrodes opposes the second external electrode while having the first body or the second body interposed therebetween.

9. The capacitor of claim 1, wherein the body includes a first body and a second body adjacent to each other and respectively connected to the first external electrode, and each of the pair of second external electrodes opposes the first external electrode while having the first body or the second body interposed therebetween.

10. The capacitor of claim 1, wherein another of the first internal electrode and the second internal electrode has a horizontal plane perpendicular to the thickness direction and an inclined plane inclined with respect to the horizontal plane in at least a partial region thereof.

11. The capacitor of claim 1, further comprising a substrate on which the body is disposed, wherein the substrate includes one integral element continuously extending from a region to overlap in the thickness direction with the first external electrode to another region to overlap in the thickness direction with the second external electrode.

12. The capacitor of claim 11, wherein the body includes another dielectric layer in contact with the substrate.

13. A multilayer capacitor comprising:

a body including a dielectric layer, and first and second internal electrodes stacked on each other in a thickness direction of the capacitor while being spaced apart from each other with the dielectric layer interposed therebetween, the first internal electrode extending from a first end surface of the body and the second internal electrode extending from a second end surface of the body;

a first external electrode disposed on the first end surface to connect to the first internal electrode; and a second external electrode spaced apart from the first external electrode in a length direction of the capacitor, and disposed on the second end surface to connect to the second internal electrode, wherein a first portion of an upper surface of one of the first internal electrode and the second internal electrode and a first portion of a lower surface of the one of the first internal electrode and the second internal electrode overlap each other in the thickness direction and have different angles with respect to one of the first end surface and the second end surface, a second portion of the upper surface of the one of the first internal electrode and the second internal electrode and a second portion of the lower surface of the one of the first internal electrode and the second internal electrode overlap each other in the thickness direction, and a difference in angle, with respect to the one of the first end surface and the second end surface, between the first portion of the upper surface and the first portion of the lower surface is greater than a difference in angle, with respect to the one of the first end surface and the second end surface, between the second portion of the upper surface and the second portion of the lower surface.

14. The capacitor of claim 13, wherein the first portion of the upper surface of the first internal electrode is inclined downward in the length direction from the first external electrode toward the second external electrode.

15. The capacitor of claim 13, wherein the first portion of the lower surface of the second internal electrode is inclined upward in the length direction from the second external electrode toward the first external electrode.

16. The capacitor of claim 13, wherein the first internal electrode and the second internal electrode are point-symmetrical to each other based on their cross sections in the thickness direction and the length direction.

17. The capacitor of claim 13, wherein the body includes a first body and a second body adjacent to each other and respectively connected to the second external electrode, and each of the pair of first external electrodes opposes the second external electrode while having the first body or the second body interposed therebetween.

18. The capacitor of claim 13, further comprising a substrate, on which the body is disposed, wherein the substrate includes one integral element continuously extending from a region to overlap in the thickness direction with the first external electrode to another region to overlap in the thickness direction with the second external electrode.

19. The capacitor of claim 18, wherein the body includes another dielectric layer in contact with the substrate.

* * * * *